2 Sheets—Sheet 1.

F. BLACKBURN & G. W. WOODSIDE.

FARE-REGISTER.

No. 7,120. Reissued May 16, 1876.

Witnesses { Dark M. Farland Jr
John F. Grant

Inventor
Frederick Blackburn
George W. Woodside
per Edw. Brown
attorney

2 Sheets—Sheet 2.

F. BLACKBURN & G. W. WOODSIDE.

FARE-REGISTER.

No. 7,120. Reissued May 16, 1876.

Witnesses { Park McFarland, Jr. / John F. Grant.

Inventor
Frederick Blackburn
George W. Woodside
per Edw^d Brown
attorney

UNITED STATES PATENT OFFICE.

FREDERICK BLACKBURN AND GEORGE W. WOODSIDE, OF PHILADELPHIA, PA., ASSIGNORS, BY MESNE ASSIGNMENTS, TO THE PASSENGER FARE ENUMERATOR AND CLASSIFIER COMPANY, OF SAME PLACE.

IMPROVEMENT IN FARE-REGISTERS.

Specification forming part of Letters Patent No. 100,715, dated March 15, 1870; antedated February 28, 1870; reissue No. 7,120, dated May 16, 1876; application filed March 28, 1876.

*To all whom it may concern:*

Be it known that we, FREDERICK BLACKBURN and GEORGE W. WOODSIDE, of Philadelphia, Pennsylvania, have invented an Improved Fare-Register; and we do hereby declare the following to be a full, clear, and exact description of the same.

Our invention consists of a box or case arranged to be carried by the conductor, or to be permanently attached to any accessible portion of a car or other public vehicle, the said box containing independent registering devices, so constructed and combined with other mechanism that the registering of each fare shall be accompanied by the sounding of an alarm or alarms, and thus effect in one compact machine a complete check upon conductors by compelling them to sound an alarm as each fare is received, to prevent the sounding of an alarm without registering, and to record each fare received, so that the total amount of each class may be read off at any subsequent time.

In order to enable others to make and use our invention, we will now proceed to describe its construction and operation, reference being had to the accompanying drawing, which forms a part of this specification, and in which—

Figure 1:
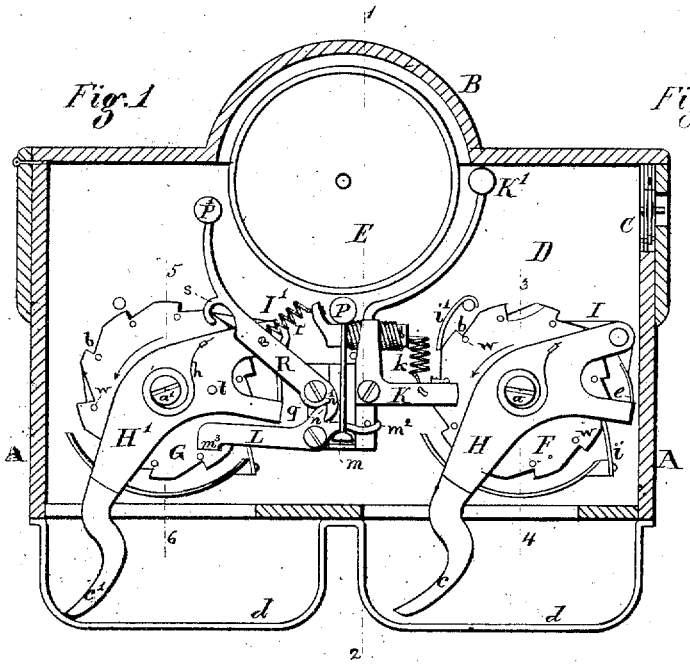
Figure 3:
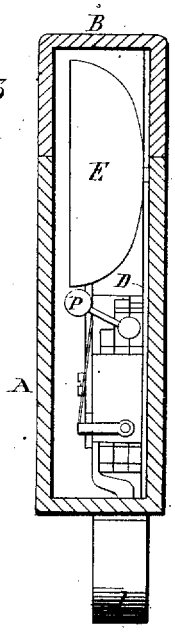
Figure 2:
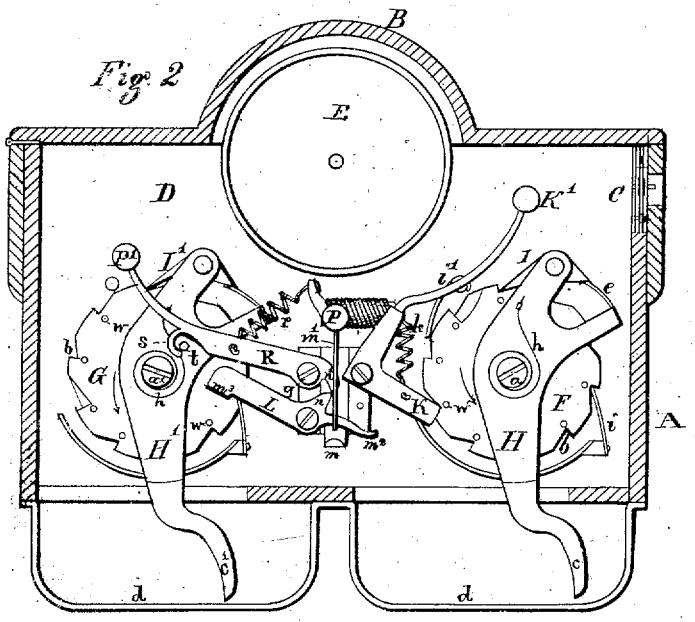
Figure 5:
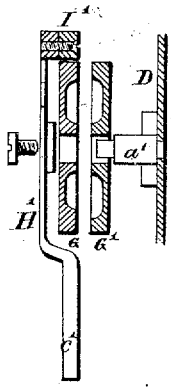
Figure 4:
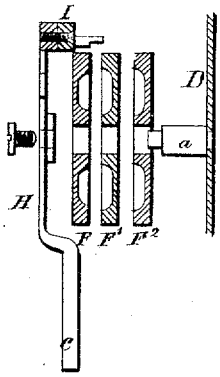
Figure 8:
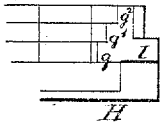
Figure 7:
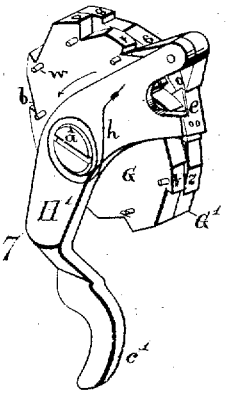
Figure 6:
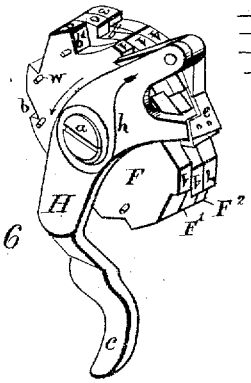

Figure 1 is a side view of our improved fare-register, with its case in section; Fig. 2, the same with some of the parts in a different position; Fig. 3, a transverse sectional view on the line 1 2, Fig. 1; Fig. 4, a transverse section on the line 3 4, Fig. 1, showing the parts separated from each other; Fig. 5, a transverse section on the line 5 6, Fig. 1, with the parts also separated; Figs. 6 and 7, perspective views of the registering-disk, and of the pawls and levers for operating the same; Fig. 8, a plan view of part of Fig. 6; and Fig. 9, a detached view, illustrating a portion of our invention.

Similar letters refer to similar parts throughout the several views.

The case of the instrument consists of a light wooden or metal box, A, having a hinged lid, B, and a suitable lock, C, for securing the same, this case or box being provided with a belt or straps, so that it can be conveniently carried by the conductor; or it may be arranged for permanent attachment to any accessible portion of the car.

Within this box, and close to one side of the same, is secured a vertical plate, D, and to the latter is attached a bell, E, and the pins $a$ and $a'$, upon which the registering-disks are arranged to freely turn—three of the said disks, F, $F^1$, and $F^2$, being hung to the pin $a$, and two, marked G and $G'$, to the pin $a'$. On the peripheries of each of these disks, and extending entirely around the same, are cut notches $b$, of which there are ten for each disk, the spaces between the notches being marked with numbers running from 0 to 9, inclusive. (See Figs. 6 and 7.)

To the pivot $a$ (in front of the disks F) is hung a lever, H, the lower arm of which projects through an opening in the bottom of the case, and is formed into a trigger, C, which is protected by a suitable guard, $d$, and to the upper forked arm of the said lever is hung a pawl, I, which engages with the notches of the disks, and is retained in the same by a spring, $e$, also attached to the lever.

It will be observed, on referring to Figs. 6 and 8, that the pawl I has three points, $g$, $g^1$, and $g^2$, of different lengths, and that the disks F and $F^1$ have each a single notch, $b'$, of greater depth than the remaining notches $b$ the object of which arrangement will be fully described hereafter.

The lever H is retained in the position shown in Fig. 1 by a coiled spring, $h$, and the disks are prevented from turning in any direction, except that indicated by the arrow, by pawls $i$, which enter the notches $b$, another spring-pawl, $i'$, also engaging with one of the notches of the outermost disk F, for a purpose hereafter explained.

The disk F is provided with a number of projecting pins, $w$, one for each notch $b$, these pins being arranged to strike and turn a bell-crank lever, K, which is hung to a projection on the plate D, and is actuated by a spring, $k$, and furnished with a hammer, $K'$, with which the bell is struck. The disks G and $G'$, at the opposite side of the instrument, are in like manner operated by a lever, H′, similar to the lever H, furnished with a double-pointed pawl, I′, and terminating at its lower end in a trigger, $c'$, which projects through the bottom of the box.

The pins $w$ of the disk G are arranged to strike a tripping-point, $m^3$, of the lever L, the short arm of which, $m^2$, in turning, bears upon and depresses an arm, $m$, which is hung to a projection of the plate D, and which is connected, by a rod or wire, $m^1$, to a spring-striker, P, placed close beneath the bell. (See Fig. 9.)

The lever L has also a hook-like projection, $n$, which engages with the hooked end $n'$ of a lever, R, the latter turning upon the point $q$, and being furnished with a hammer, P′, which, owing to the action of a spring, $r$, is arranged to strike the bell when the lever is released.

A hook, $s$, at the extremity of the long arm of the lever L, is, under the circumstances described hereafter, arranged to be caught and held by a projecting pin, $t$, on the side of the lever H′.

The object of the above-described instrument is to provide a check upon conductors of cars and other public vehicles by compelling them, as each fare is received, to register the same upon the disks, and to attract the attention of the passengers to the act of registering by sounding an alarm upon the bell E, one stroke of the hammer K′ indicating that a full fare has been registered upon the disks F, and two strokes in quick succession from the hammers P and P′ (which may differ in tone from the stroke of the hammer K′) indicating the registering of a half-fare upon the disks G.

Passengers will soon become accustomed to and will expect to hear the alarm on paying their fares, and conductors will thus be obliged to register each as it is received, so that the proper officer at the headquarters of the company can, at the end of the trip or of the day's work, determine the exact amount of money received by the conductor.

The operation of the instrument is as follows: On the payment of each full fare the conductor draws the trigger $c$ from its position in Fig. 1 to that shown in Fig. 2, this causing the pawl I to turn the disk F in the direction of the arrow to the extent of one notch; but the remaining disks, $F^1$ and $F^2$, remain stationary, as the shorter points $g^1$ $g^2$ of the pawl pass over without entering their notches. In thus turning the disk F one of its pins $w$ strikes and turns the bell-crank lever K and throws back the hammer K′, as seen in Fig. 2, and on continuing the motion of the disk beyond this point the lever and its hammer will be released, the latter striking the bell and sounding the desired alarm.

It will be observed, on referring to Fig. 6, that the most elevated row of numbers taken across the disks is 3 0 0, which may be read as three hundred. The turning of the first disk F to the extent of one notch will increase this number to 301, and so on until the number 309 is reached, when the long point $g$ of the pawl will drop into the deep notch $b'$ of the disk F, enabling its shorter point $g^1$ to drop into one of the notches of the disk $F^1$, so that at the next pulling of the trigger both disks will be turned to the extent of one notch, and the number 310 will be registered. In moving all of the disks—as, for instance, in changing from 399 to 400—the operation will be the same, both points $g$ and $g^1$ then dropping into the deep notches of their disks, in order to enable the shortest point $g^2$ to turn the third disk to the desired extent. The spring-pawls $i$, as before mentioned, prevent a retrograde motion of the disks; and the pawl $i'$, the point of which is intermediate between the teeth when the point of $i$ is in contact with a tooth, prevents the disk F from being turned to such an extent as to sound the alarm, and then be returned to its former position without registering a fare.

Figure 9:
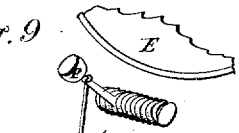

The sounding of a double alarm on registering half-fares upon the disks G and G′ is effected as follows: (The method of registering is the same as upon the disks F, and will need no further description.) On turning the lever H′ in the direction of the arrow, and operating the disk G, one of the pins $w$ of the latter will strike and turn the lever L, so that the hammer P will, through the devices described, be drawn back from the bell, as shown in Fig. 9. The lever R will at the same time be so operated by the hook $n$ of the lever L as to draw back its hammer P′, and cause its hook $s$ to pass over the pin $t$ of the lever H′. On continuing to move the latter in the direction of the arrow, the lever L will be released by the pin $w$, and the first alarm will be struck by the hammer P. The lever R will also be released by the hooked projection $n$ of the lever L, but will be instantly caught by the pin $t$ of the lever H′, and not finally released until the latter is itself permitted to return to its former position, Fig. 1, when the second alarm will be sounded by the striker P′.

We claim as our invention and desire to secure by Letters Patent—

1. The combination, in a fare-box, of two independent registering mechanisms, for whole and half fares, and an alarm or alarms, which, on being sounded, distinguishes the character of the fare received and recorded, all substantially as described.

2. The combination, with the whole-fare register and bell E, of the disk G, (for registering half-fares,) pins $w$, or their equivalents, and two levers or hammers so arranged as to both strike the bell on the movement of the disk, substantially as specified.

3. The combination of the arm $m$, connecting rod or wire $m^1$, and spring-striker P with a spring striking-lever, R, and lever L, operated by pins $w$ of the disk G, substantially in the manner described.

4. In a passenger fare-register and alarm, the combination of the operating-lever H, double pawl I, registering-disks F $F^1$, striking-hammer K′, and alarm-bell E, substantially as herein described.

5. In a passenger fare-register and alarm, the combination of the operating-lever H′, double pawl I′, pins *v* on disk G, the intermediate tripping-lever L, striking-hammer P′, and alarm-bell E, substantially as herein set forth.

6. In a passenger fare-register and alarm, two or more independent registering mechanisms for recording fares of different values, each in combination with a separate striking mechanism, operating on a single bell, E, whereby the recording of fares may be properly indicated, as described.

7. The combination, with a passenger fare-register and alarm, of the tripping-lever L, provided with a tripping-point, $m^3$, and one or more projections for raising the alarm-hammer, as herein set forth.

8. In a passenger fare-register and alarm, one or more ratchet-teeth or bearing-places, *s*, adapted to receive a detent, *t*, and such detent serving to prevent sounding of the alarm until the detent has been withdrawn, as herein set forth.

9. In a passenger fare-register and alarm, the combination of the lever H, actuating the recording-disks F $F^1$, tripping-pins *w*, striking-hammer K′, alarm-bell E, and a spring-pawl, *i*′, falling into ratchet-teeth, to retain the registering mechanism, and prevent the sounding of an alarm without registering a fare.

F. BLACKBURN.
GEO. W. WOODSIDE.

Witnesses:
GEO. C. SHELMERDINE,
A. P. BURCHELL.